G. A. HARMUTH.
TIRE BOOT.
APPLICATION FILED JAN. 31, 1919.
1,318,077.
Patented Oct. 7, 1919.
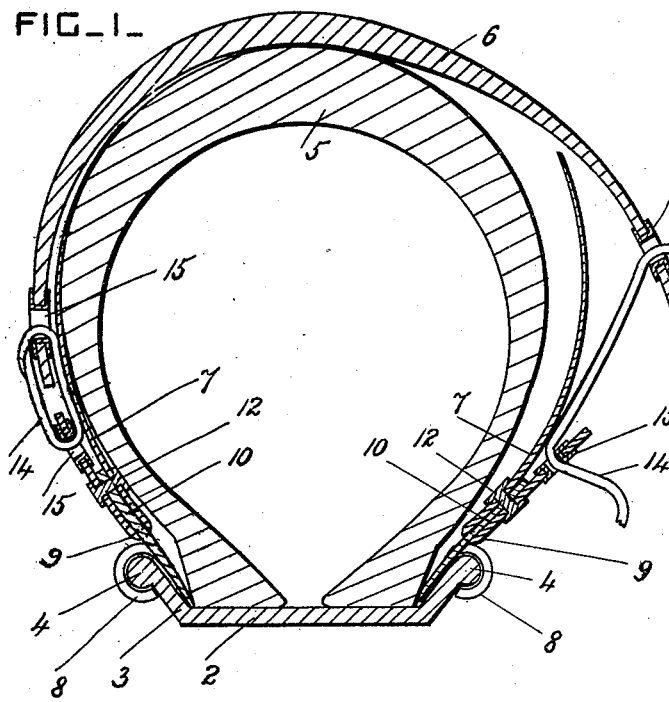
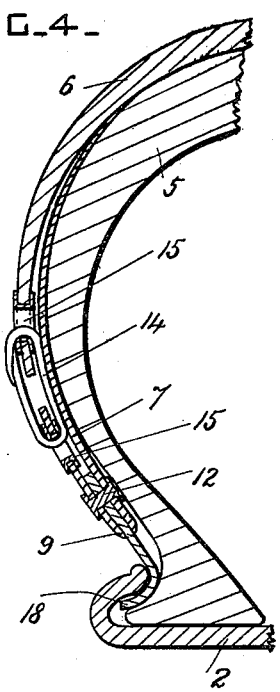
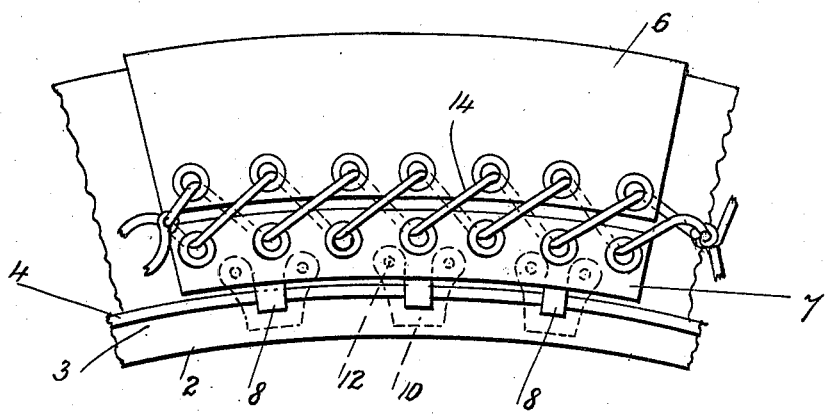
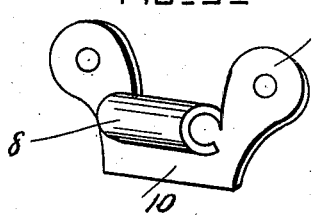
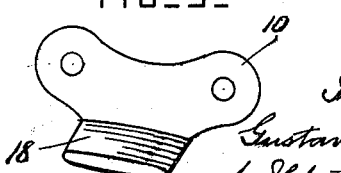
Inventor
Gustave A. Harmuth
by Herbert W. T. Jenner.
Attorney.

UNITED STATES PATENT OFFICE.

GUSTAVE A. HARMUTH, OF DRUMRIGHT, OKLAHOMA.

TIRE-BOOT.

1,318,077.  Specification of Letters Patent.  Patented Oct. 7, 1919.

Application filed January 31, 1919. Serial No. 274,230.

*To all whom it may concern:*

Be it known that I, GUSTAVE A. HARMUTH, a citizen of Hungary, residing at Drumright, in the county of Creek and State of Oklahoma, have invented certain new and useful Improvements in Tire-Boots, of which the following is a specification.

This invention relates to boots for repairing blow holes and other injuries to the casings of the pneumatic tires used on vehicle wheels; and it consists in the novel construction and combination of the parts hereinafter fully described and claimed.

In the drawings, Figure 1 is a cross-section through a boot constructed according to this invention, showing it applied to a straight wheel rim. Fig. 2 is a side view of the same. Fig. 3 is a detail view of one of the hooks shown in Figs. 1 and 2. Fig. 4 is a cross-section similar to Fig. 1, but illustrates how the boot is secured to a clencher wheel rim. Fig. 5 is a detail view of one of the hooks shown in Fig. 4.

The wheel rim 2, shown in Figs. 1, 2 and 3 has straight or outwardly projecting flanges 3 having beads 4 at their tops. The tire casing 5 is of any approved make, and it is seated in the channel of the rim between the flanges 3. The air tube is placed inside the casing in the usual way.

The boot is provided with a tread or top piece 6, and two side pieces 7, all formed of any suitable flexible material, such as leather. The side pieces are both alike, and they are connected to the flanges of the rim by hooks 8. The lower parts of the side pieces are doubled over to form folds 9, and the shanks 10 of the hooks are secured in these folds by rivets 12, so that the hooks project through holes in the bottoms of the folds. The edges of the tread piece are arranged to overlap the upper parts of the side pieces, and the overlapping parts are suitably beveled or tapered. The folds of the side pieces and the edges of the tread piece are adjustably connected together by draw-strings or laces 14.

These draw-strings engage with eyelets 15 or other similar fastening devices, such as the fastening hooks used on foot wear. The eyelets are secured in holes in the tread piece and side pieces, and the draw-strings are laced through them so as to draw the tread-piece tightly against the blow hole or other injury to the casing.

In the form of the device shown in Figs. 1, 2 and 3, the top portion of each hook shank is forked, and the hook is formed at the upper part of the shank from the metal removed to form the fork. The hook is bent downwardly so that it engages with the bead at the top of the rim flange. The shanks of the hooks are thrust between the rim flanges and the tire casing, so that the flanges are securely engaged by the hooks.

In the form of the device shown in Figs. 4 and 5, the hooks 18 are formed at the bottoms of the shanks, and they engage with the inwardly projecting flanges of the clencher rim.

The boot can be adjusted and tightened by means of the draw-strings as often as necessary.

What I claim is:

1. The combination, with a wheel rim, and a tire casing; of a boot comprising a tread piece, side pieces having folds at their lower parts, fastening devices secured to the said folds and detachably connected with the wheel rim, and means for connecting the outer portions of the folds to the said tread piece.

2. The combination, with a wheel rim, and a tire casing; of a boot comprising a tread piece, side pieces having folds at their lower parts, hooks provided with shanks having forked upper end portions which are secured between the folds of the said side pieces, said hooks being detachably connected with the wheel rim, and means for connecting the outer portions of the folds to the said tread piece.

3. The combination, with a flanged wheel rim, and a tire casing engaging therewith; of a boot comprising a tread piece and two similar side pieces, the said side pieces having folds at their lower parts and having their upper parts overlapped by the said tread piece, hooks secured to the said folds and engaging with the flanges of the wheel rim, and draw-strings adjustably connecting the folds of the side pieces with the tread piece.

4. The combination, with a flanged wheel rim having beads at its edges, and a tire cover engaging therewith; of a boot comprising a tread piece and two similar side pieces, hooks provided with shanks having forked upper portions which are secured to the said side pieces, said hooks being bent downwardly over the said beads and the lower parts of the shanks being thrust between the rim flanges and the said casing, and draw-strings adjustably connecting the side pieces with the tread piece.

In testimony whereof I have affixed my signature.

GUSTAVE A. HARMUTH.

Copies of this patent may be obtained for five cents each, by addressing the "Commissioner of Patents, Washington, D. C."